(12) United States Patent
Kajiyama (10) Patent No.: US 8,009,205 B2
(45) Date of Patent: Aug. 30, 2011

(54) IMAGING DEVICE AND CONTROL METHOD OF IMAGING DEVICE

(75) Inventor: Takashi Kajiyama, Kudamatsu (JP)

(73) Assignee: Ricoh Company, Ltd., Tokyo (JP)

( * ) Notice: Subject to any disclaimer, the term of this patent is extended or adjusted under 35 U.S.C. 154(b) by 771 days.

(21) Appl. No.: 12/068,837

(22) Filed: Feb. 12, 2008

(65) Prior Publication Data

US 2008/0211926 A1 Sep. 4, 2008

(30) Foreign Application Priority Data

Feb. 13, 2007 (JP) ................................. 2007-032686

(51) Int. Cl.
*H04N 5/76* (2006.01)
(52) U.S. Cl. ............... 348/231.3; 348/231.1; 348/231.2; 348/231.4; 348/231.5; 348/231.6; 348/231.7; 348/231.8; 348/231.9
(58) Field of Classification Search .................. None
See application file for complete search history.

(56) References Cited

U.S. PATENT DOCUMENTS

| 5,978,016 | A | 11/1999 | Lourette et al. | |
|---|---|---|---|---|
| 2002/0114621 | A1 * | 8/2002 | Tsunoda | 386/111 |
| 2006/0280497 | A1 * | 12/2006 | Wakabayashi | 396/287 |
| 2007/0124333 | A1 * | 5/2007 | Bontempi | 707/104.1 |

FOREIGN PATENT DOCUMENTS

| JP | 05-049000 | 2/1993 |
|---|---|---|
| JP | 10-243275 | 9/1998 |
| JP | 2000-207262 | 7/2000 |
| JP | 2003-279841 | 10/2003 |
| JP | 2003-279845 | 10/2003 |
| JP | 2004-064591 | 2/2004 |
| JP | 2004-219943 | 8/2004 |
| JP | 2004-229021 | 8/2004 |
| JP | 2004-260630 | 9/2004 |
| JP | 2004-279721 | 10/2004 |
| JP | 2004-333828 | 11/2004 |
| JP | 2005-182216 | 7/2005 |
| JP | 2005-203994 | 7/2005 |
| JP | 2005354416 A * | 12/2005 |
| JP | 3779247 | 3/2006 |
| JP | 2006-139294 | 6/2006 |
| JP | 2008-78828 | 4/2008 |
| JP | 2008-199317 A | 8/2008 |
| JP | 2008-227918 A | 9/2008 |

\* cited by examiner

*Primary Examiner* — Nicholas G Giles
*Assistant Examiner* — Yih-Sien Kao
(74) *Attorney, Agent, or Firm* — Dickstein Shapiro LLP (57) ABSTRACT

An imaging device to which a portable storage medium is attachable, includes: a portable storage medium attachment section which attaches the portable storage medium; an inside storage medium which links image data imaged to information of imaging date and time and stores the data; and a transfer control section which controls a transfer of the image data from the inside storage medium to the portable storage medium, the portable storage medium having a data area which stores the image data transferred and a system area which stores management data generated corresponding to the image data stored in the data area, the transfer control section setting time stamp information of the management data generated in the portable storage medium corresponding to the image data transferred from the inside storage medium to the portable storage medium as the information of imaging date and time linked to the image data transferred.

14 Claims, 6 Drawing Sheets

| SOI | START OF DATA |
|---|---|
| APPn | ATTACHED INFORMATION |
| DQT | QUANTIZATION TABLE |
| DHT | HUFFMAN TABLE |
| SOF | FRAME HEADER |
| SOS | SCAN HEADER |
|  | IMAGE COMPRESSED DATA |
| EOI | END OF DATA |

IMAGING DEVICE AND CONTROL METHOD OF IMAGING DEVICE

BACKGROUND OF THE INVENTION

1. Field of the Invention

The present invention relates to an imaging device and a method for controlling the imaging device. In particular, the invention relates to a process of replicating an image recorded inside the imaging device to a portable storage medium.

2. Description of the Related Art

In recent years, an imaging device such as a digital camera in which an image taken optically is recorded electronically has become popular. In general, in an electronic imaging device such as a digital camera, imaging data is recorded according to a file system format such as FAT (File Allocation Tables) which is usable by major OS (Operating Systems) of a PC/AT-compatible machine. As a result, it is possible to access the imaging data without using an intermediate application in other equipment such as a computer. In addition, in such an electronic imaging device, information on imaging date and time can be stored electronically, and various proposals have been put forward regarding means of utilization of the information. For example, data management of search and sort, evidence in an electronic official document, and judgment of time in an evidence image of an event or an accident, etc. are cited. Recorded information in a format regulated by an application such as Exif (Exchangeable Image File Format) can be used as imaging date and time of an image, instead of timing information generated in the above-mentioned file system format.

When the image data stored in a storage medium inside the electronic imaging device or a portable storage medium which is attachable to the electronic imaging device is transferred to HDD (Hard Disk Drive) or the like of a computer which is the host device, generally, the timing information generated in the file system format is rewritten by the date and time of transfer.

Moreover, when replicating data from a storage medium inside a hyperopia imaging device to a portable storage medium, generally, date and time information is rewritten by date and time when performing the replication. Therefore, after the image data is replicated even once, information on the imaging date and time can be obtained only from information at the application level. To solve such a problem, in JP 2000-207262 A, a method that rewrites timing information provided by a file system format based on information at the application level when image data is transferred from an electronic imaging device to a host device, is proposed.

However, the method described in JP 2000-207262 A needs a function closer to a system base including basic software such as OS. In addition, a corresponding application is necessary to refer to the information at the application level. Therefore, it is unsuitable for general-purpose use. On the other hand, in recent years, a mode that carries out an administration while still storing image data in a portable storage medium such as an SD card (registered trademark) has increased too, and it is not necessary to execute the image data replication from the electronic imaging device to the host device.

Furthermore, when image data transfer is conducted among users by a portable storage medium, if it is a user who generated (imaged) the image data, the possibility of having a special application is high, and it is possible to know the imaging date and time referring to information at the application level. If it is a user who received the portable storage medium, the possibility that there is no special application and that information at the application level can not be referred to is high, and the imaging date and time of the image received can not be known.

Therefore, when replicating the data from the storage medium inside the electronic imaging device to the portable storage medium, if the timing information provided by the file system format is rewritten, the problem can not be solved by the method described in JP 2000-207262 A. Similarly, in an imaging device which is capable of being inserted with a plurality of portable storage media, a similar problem arises when the data is replicated from one portable storage medium to another portable storage medium.

SUMMARY OF THE INVENTION

At least an object of the present invention is to provide an electronic imaging device which is capable of setting date and time (time stamp information), acquirable by a basic software, as imaging date and time when image data is transferred to a portable storage medium attached to the device itself.

In light of the above, the present invention proposes, for example, an imaging device to which a portable storage medium is attachable, including: a portable storage medium attachment section which attaches the portable storage medium; an inside storage medium which links image data imaged to information of imaging date and time and stores the data; and a transfer control section which controls a transfer of the image data from the inside storage medium to the portable storage medium, the portable storage medium having a data area which stores the image data transferred; and a system area which stores management data generated corresponding to the image data stored in the data area, the transfer control section setting time stamp information of the management data generated in the portable storage medium corresponding to the image data transferred from the inside storage medium to the portable storage medium as the information of imaging date and time linked to the image data transferred.

In addition, the present invention proposes, for example, a method for controlling an imaging device to which a portable storage medium is attachable. The method comprises: linking image data taken by the imaging device to information of imaging date and time and storing the data inside the imaging device; transferring the image data from inside the imaging device to the portable storage medium attached to the imaging device; generating management data corresponding to the image data transferred in the portable storage medium; and setting time stamp information of the generated management data as the information of imaging date and time linked to the transferred image data.

BRIEF DESCRIPTION OF THE DRAWINGS

The invention will be described further below with reference to embodiments and the accompanying schematic drawings, in which:

FIG. 1 is a block view illustrating an overall structure of an imaging device according to an embodiment of the invention;

DETAILED DESCRIPTION OF THE PREFERRED EMBODIMENTS

The entire contents of Japanese patent application No. JP 2007-032686, filed on Feb. 13, 2007, of which the convention priority is claimed in this application, are incorporated hereinto by reference.

According to the present invention, for example, when image data stored in a storage medium inside an electronic imaging device is replicated to a portable storage medium attached to the electronic imaging device, date and time (time stamp information), acquirable by basic software, is set depending on the date and time (time stamp information) acquirable by an application software.

Embodiment 1

In the first embodiment, an example is described of transferring image data from a built-in storage medium provided inside the imaging device to a portable storage medium attached to the imaging device.

Figure 1:
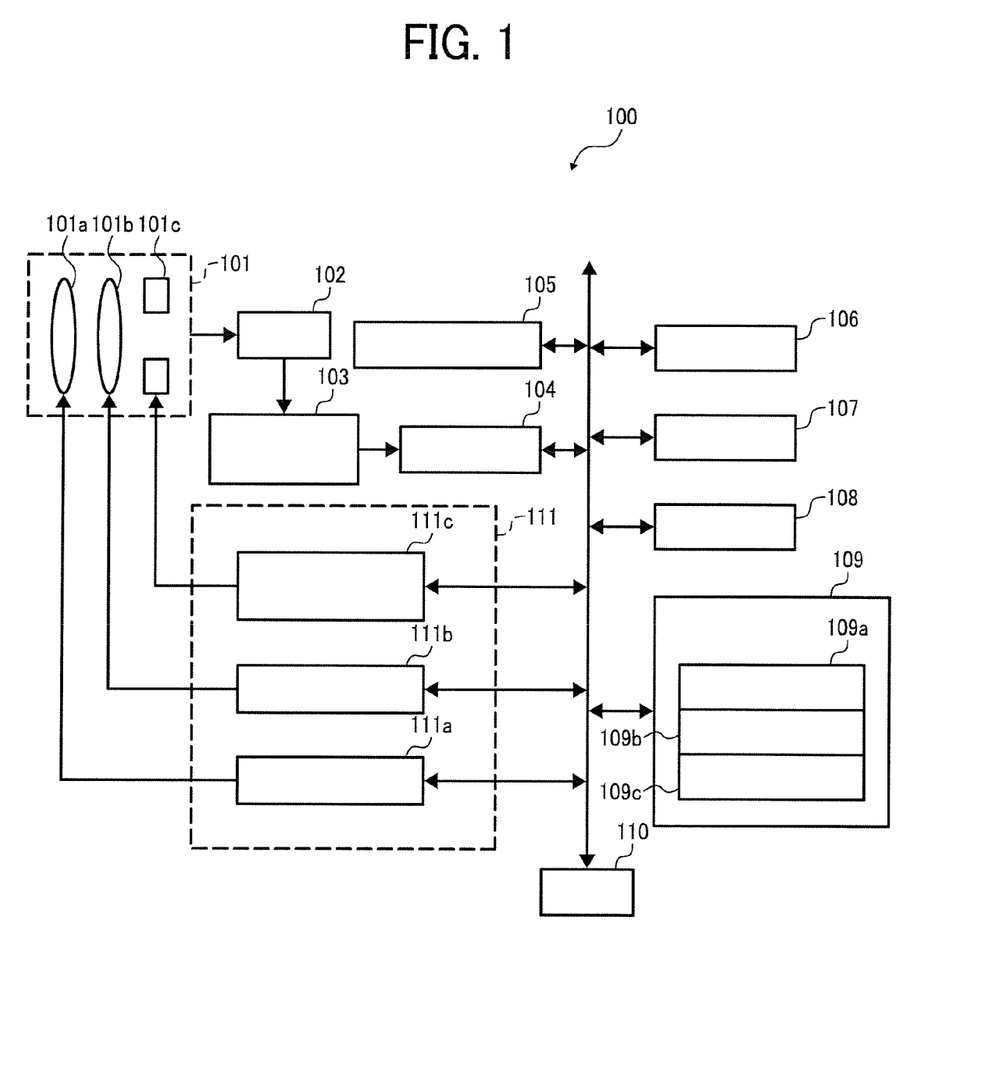
FIG. 1 is a block diagram illustrating an overall structure of an imaging device according to an embodiment of the invention.

As illustrated in FIG. 1, an imaging device 100 according to the present embodiment, includes: an imaging lens 101 having a zoom lens 101a, a focus lens 101b and an imaging mechanism 101c; a CCD (Charge-Coupled Device) 102; a digital data generation section 103; an image processing section 104; a card slot 105; a USB communication section 106; a liquid crystal display 107; an operation section 108; a nonvolatile memory 109 inside of which has a control program 109a, an image storage section 109b, and a work area 109c; a CPU 110; and an imaging control section 111 having a zoom control section 111a, a focus control section 111b and an imaging mechanism control section 111c.

The imaging lens 101 images a subject on the CCD 102, and the zoom lens 101a changes the magnification of a subject image imaged on the CCD 102. The focus lens 101b focuses light, imaged on the CCD 102, on the subject. The imaging mechanism 101c has an aperture section which is configured to adjust an amount of light entering the CCD 102, a shutter and an optical filter, etc. A shutter speed is adjusted by changing the opening and closing time of the shutter included in the imaging mechanism. The CCD 102 receives light imaged by the imaging lens 101, and converts optical information into an analog electric signal.

The CCD 102 inputs the analog electric signal generated based on the optical information received from the imaging lens 101 to the digital data generation section 103. The digital data generation section 103 has a CDS (Correlation Double Sampling) circuit which is configured to conduct correlated double sampling of the analog electric signal input from the CCD 102 and to remove noise, an AGC (Automatic Gain Control) circuit which is configured to perform a gain adjustment, and an A/D (Analog/Digital) conversion circuit which is configured to convert the analog electric signal into a digital signal.

The image processing section 104 performs various image processings on digital image data generated by the digital data generation section 103. For example, the image processing section 104 carries out the processings such as converting the image data acquired from the digital data generation section 103 into YUV format (Y: brightness information, U: blue color difference information, V: red color difference information), and compressing or decompressing image data in YUV format with a compression technology such as JPEG.

In addition, the image processing section 104, according to the present embodiment, compresses the image data with the JPEG compression technology. The image processing section 104 performs the image processing in the work area 109c of the nonvolatile memory 109, and stores the generated image data in the image storage section 109b. Additional information such as photographing date and time (imaging date and time) is added to the image data generated by the image processing section 104 and stored in the image storage section 109b, to allow Exif (Exchangeable Image File Format) compliance, which is a file format of the digital camera, by the CPU 110.

Then, the data is properly transferred to a portable storage medium inserted in the card slot 105, according to the instruction of a user or a setting of the imaging device 100. The card slot 105 is a slot which is inserted with the portable storage medium such as a Compact Flash® card, Smart Media®, SD® card, and Memory Stick®. That is to say, the card slot 105 functions as a portable storage medium attachment section in the imaging device 100.

The USB communication section 106 communicates with a host device such as a computer by a USB (Universal Serial Bus) line. The liquid crystal display 107 is used as a visual display when displaying a monitoring image (through-the-lens image) for deciding a subject or composition during imaging, confirming an image imaged, and changing a setting of the imaging device 100 or the like.

The operation section 108 has a switch, a slide bar, and a dial or the like for the user to operate the imaging device 100. In particular, a power supply SW which switches ON/OFF of the power supply, a mode SW which switches a photographing mode and a moving image mode or the like, a release SW which presses the shutter or the like are included in the operation section 108. Each of operations to the operation section 108 is transferred to a control section which controls movements of the entire imaging device 100.

The CPU 110 works with the control program 109a stored in the nonvolatile memory 109 and other drive circuits, and constitutes the control section (a control section 110a) which controls the movements of the entire imaging device 100. In addition, the control section 110a according to the present embodiment also functions as a transfer control section configured to transfer the image data from the nonvolatile memory 109 which is the storage medium inside the imaging device 100, to a portable storage medium 300.

Figure 2:
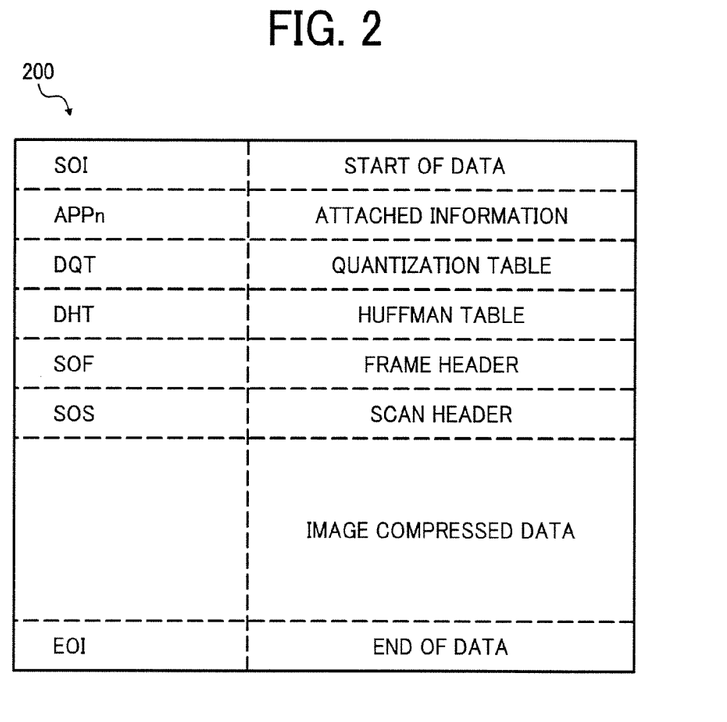
FIG. 2 is a view illustrating data formation of image data taken and generated by the imaging device according to the embodiment of the invention.

Next, data formation of the image data stored in the image storage section 109b will be explained with reference to FIG. 2. As illustrated in FIG. 2, according to the present embodiment, image data 200 which is imaged by the imaging device 100 and processed by the image processing section 104 includes SOI (Start of Image) which presents start of data; APPn (Reserved for Application segments) which embeds information used by an upper-layer application; DQT (Define Quantization Table) which defines an actual condition of a quantization table; DHT (Define Huffman Table) which defines an actual condition of a Huffman table; SOF (Start of Frame) which performs such as setting of image dimension or sample rate; SOS (Start of Scan) which determines for each component which Huffman table is used, and EOI (End of Image) which presents image compressed data and end of data.

The imaging date and time data which is invariable permanently as data when taking the image, is acquired by a RTC (Real Time Clock) module provided in the imaging device 100, and stored in APPn which is editable by the upper-layer application. Therefore, to refer to data such as the imaging date and time stored in APPn, in addition to the basic software such as OS, a special application software is necessary.

Figure 3:
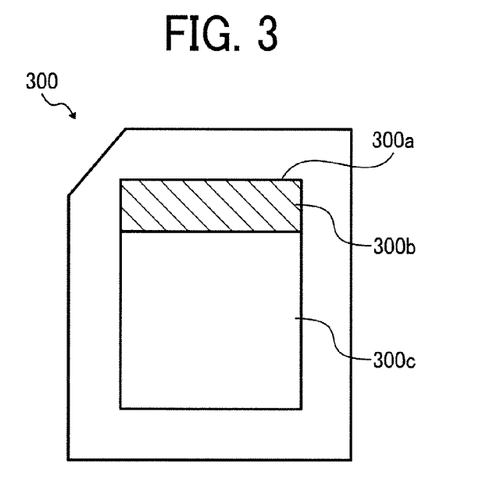
FIG. 3 is a schematic view illustrating a memory area of a portable storage medium attached to the imaging device according to the embodiment of the invention.

Next, the format of the portable storage medium 300 inserted in the card slot 105 will be explained referring to FIG. 3. FIG. 3 is a schematic view illustrating the structure of a storage area 300a inside the portable storage medium 300. The storage area 300a is formatted by a file system which is compatible with a file system used in the host device such as a personal computer or a server.

The imaging device 100 according to the present embodiment formats the portable storage medium 300 inserted in the card slot 105 with the FAT system. Thus, the storage area 300a is divided into a system area 300b and a data area 300c. When the image data is stored in the portable storage medium 300, the image data 200 explained in FIG. 2 is stored in the data area 300c. In addition to that, the system area 300b is updated, corresponding to the image data 200, to the data area 300c.

The system area 300b is an area which is editable by the basic software such as OS, and stores information which regulates the recording format of the portable storage medium 300, information on status of use of the data area 300c, and administrative information of file and directory recorded in the data area 300c. That is, information related to data generation (update) date and time of the data stored in the data area 300c, i.e. time stamp information is stored in the system area 300b, and the information is referable by the basic software such as OS. In the processing according to a usual file system, when the image data 200 is transferred from the image storage section 109b of the imaging device 100 to the data area 300c of the portable storage medium 300, date and time of transfer is stored in the system area 300b as the data generation data and time. According to the present embodiment, the information in the system area 300b is set to the imaging date and time.

Figure 4:
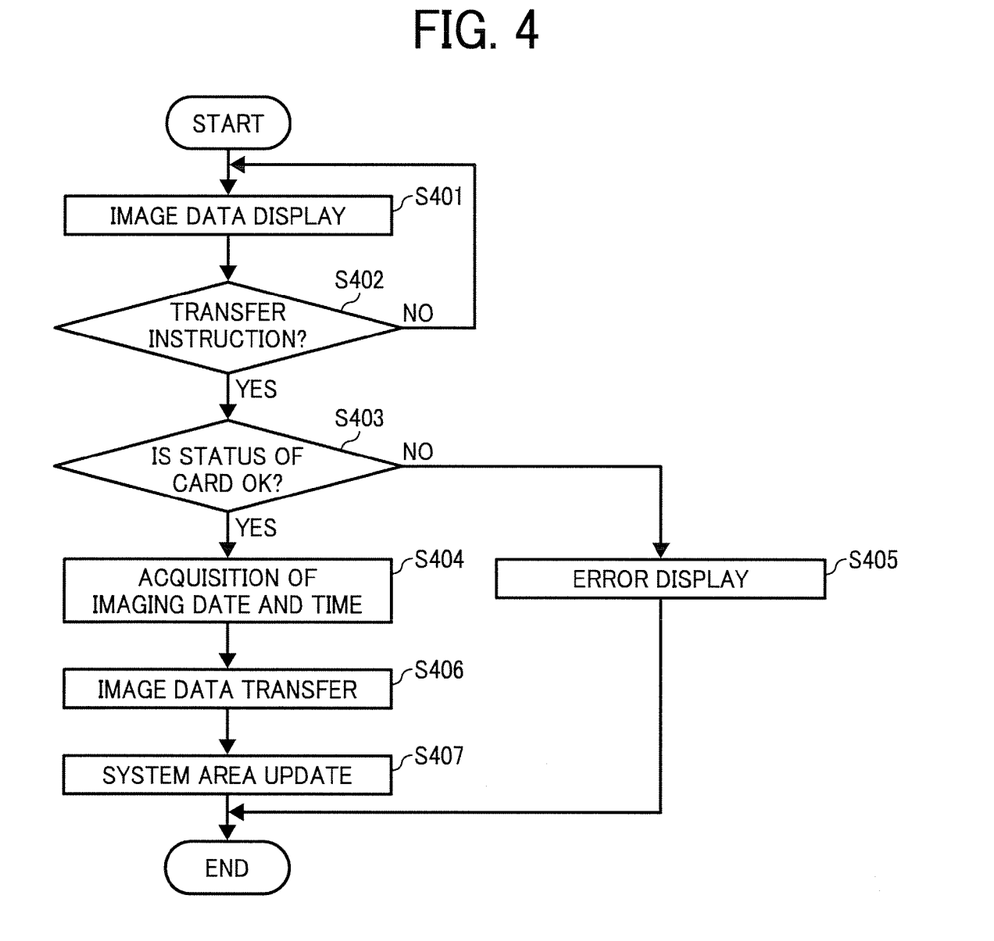
FIG. 4 is a flowchart illustrating data transfer operation in the imaging device according the embodiment of the invention.

Next, a data transfer operation from the image storage section 109b to the portable storage medium 300, inserted in the card slot 105, will be explained referring to FIG. 4, FIGS. 5A and 5B. FIG. 4 is a flow chart illustrating an operation of transferring the image data 200 from the image storage section 109b to the storage area 300a of the portable storage medium 300, inserted in the card slot 105 in the imaging device 100 according to the present embodiment.

Figure 5A:
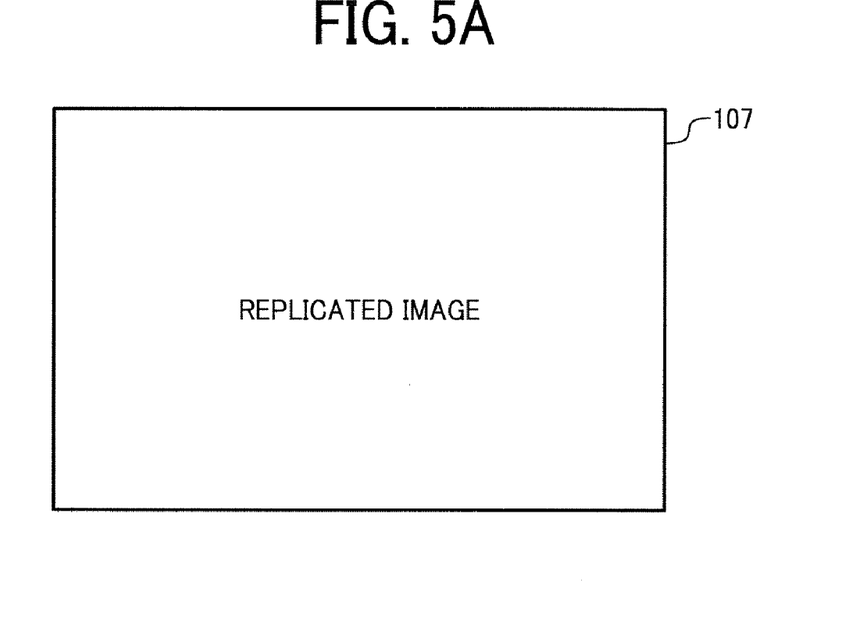
FIGS. 5A and 5B are views each of which illustrates a display example of a liquid crystal display of the imaging device according to the embodiment of the invention.
Figure 5B:
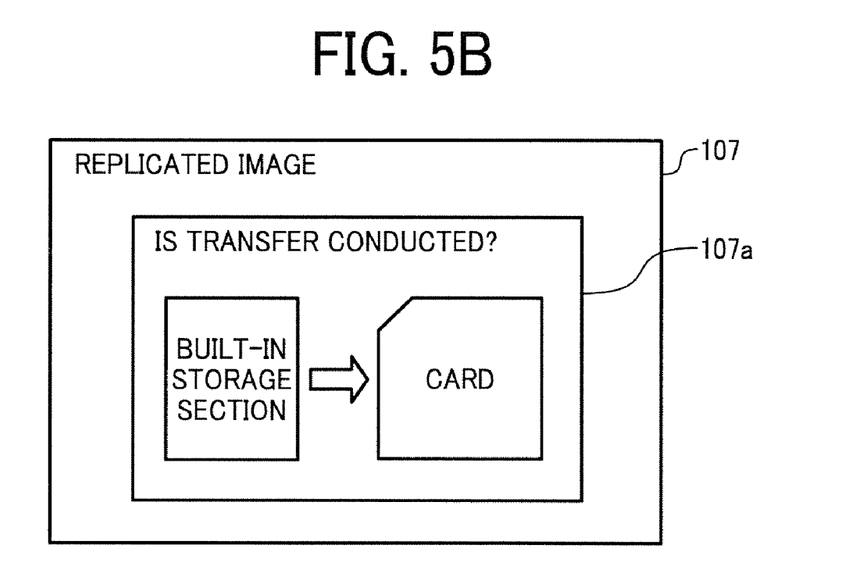

In addition, FIGS. 5A and 5B are views illustrating screen displays of the liquid crystal display 107 in the imaging device 100 according to the present embodiment. When the image data 200 stored in the image storage section 109b is transferred to the portable storage medium 300, first, the image data 200 transferred to the liquid crystal display 107 is displayed and confirmed (S401). At this time, the image data 200 is displayed on the liquid crystal display 107 as a replicated image, as illustrated in FIG. 5A. Here, when a prescribed operation is carried out by a user to the operation section 108, as illustrated in FIG. 5B, the control section 11a displays a confirmation screen 107a as to whether to transfer the image data to the portable storage medium 300 on the liquid crystal display 107, and makes a confirmation as to whether to conduct a data transfer for the user (S402).

When the data transfer is instructed by the user (S402), the control section 110a confirms the card slot 105 and the inserted portable storage medium 300 (S403). Here, whether the portable storage medium 300 is inserted in the card slot 105 or not, whether empty capacity of the portable storage medium 300 is sufficient or not, and whether a file name is usable or not or the like are confirmed, and thus whether the data transfer is available or not is confirmed.

As a result of the confirmation of S403, if the data transfer is judged to be impossible, the control section 110a displays an error screen on the liquid crystal display 107 (S405) and ends the processing. If the data transfer is judged to be possible as the result of the confirmation of S403, the control section 110a acquires the imaging date and time information from APPn of the image data 200 explained in FIG. 2 (S404).

And, the image data 200 specified by the user is transferred to the data area 300c of the portable storage medium 300 (S406).

Herewith, the system area 300b of the portable storage medium 300 is updated. At this time, since the control section 110a updates the system area 300b according to a regulated FAT format, the date and time recorded in the system area 300b depends on date and time when the transfer of S406 is conducted. Next, the control section 110a rewrites the data generation date and time recorded in the system area 300b into the imaging date and time acquired in S404 (S407), and then ends the processing.

The data transfer from the image storage section 109b to the portable storage medium 300 is completed by the above-mentioned operations. When the portable storage medium 300 is inserted in the card slot provided in the host device, and the image data 200 stored in the portable storage medium 300 is confirmed, the data generation date and time is recorded as the imaging date and time. As above-mentioned, the data generation date and time is information acquirable by the basic software such as OS, and to acquire it, there is no need for a special application software which is necessary when acquiring the information stored in APPn inside the image data 200.

As a result, when administration is performed at a state of storing the image data 200 taken by the imaging device 100 in the portable storage medium 300, even if the special application is not provided, it is possible to obtain the imaging date and time of the image from the information acquirable by the basic software. Moreover, since it is not needed to access information at the application level, it is possible to acquire the information with a higher speed.

When the processing according to S407 in FIG. 4 is carried out on the basic software such as OS, it is a processing compliant with the file system, or a processing which influences basic processing provided by OS. Therefore, even if the versatility is low when carrying out the processing in the data transfer from the imaging device 100 to the host device, it is significant that the processing according to the present embodiment is a processing inside the imaging device 100 and can be carried out without such a restriction.

As explained above, according to the present embodiment, it is possible to provide the electronic imaging device in which the date and time of the time stamp information acquirable by the basic software is capable of being set as the imaging date and time when in the imaging device 100, the image data is transferred to the portable storage medium attached to the device itself.

In addition, in the above explanation, when the data is transferred from the image storage section 109b to the portable storage medium 300, the imaging date and time is acquired referring to APPn of the image data 200 stored in the image storage section 109b, but it is not limited to this and it is also possible to format the image storage section 109b according to the file system such as FAT as illustrated in FIG. 3, and acquire the imaging date and time by referring to the data generation date and time stored in the system area.

Usually, the image data stored inside the imaging device is the data of the image taken by the imaging device. Therefore, the data generation date and time of the system area of the image data stored in the image storage section 109b is substantially the same as the imaging date and time, and thus the imaging date and time can be reflected in the later transfer data. Moreover, it is possible to simplify the processing since it is not needed to refer to the information at the application level such as APPn.

Furthermore, in the above explanation, as illustrated in FIG. 3, the system area 300b is secured from the head, and the data area 300c is assigned afterwards in the storage area 300a of the portable storage medium 300. However, the system area 300b and the data area 300c can be distributed over the entire storage area 300a, and do not need to be arranged together particularly as illustrated in FIG. 3.

Moreover, in the above explanation, the image data imaged is stored in the image storage section 109b which is an internal storage medium of the imaging device 100 once, and then is transferred to the portable storage medium 300 according to the instruction of the user. However, it is also possible to apply the present embodiment for a case in which the image data imaged is stored automatically in the portable storage medium 300 according to the setting of the imaging device 100.

That is, after the imaging device 100 has taken an image, and while image data is being processed by the image processing section 104, the image data is stored temporarily in the image storage section 109b or the work area 109c of the nonvolatile memory 109, and then is transferred to the portable storage medium inserted in the card slot 105. Therefore, due to transfer from the storage medium inside the imaging device such as the image storage section 109b to the portable storage medium 300 being necessary, by applying the present embodiment during the transfer, it is possible to obtain an equivalent effect to the above-mentioned one.

Embodiment 2

In the first embodiment, an example of transferring the data from the storage area inside the imaging device 100 to the portable storage medium attached to the imaging device 100 is explained. In the second embodiment, for example, the imaging device 100 can use a plurality of portable storage media, and data is transferred (retransferred) from one portable storage medium to another portable storage medium.

In the present embodiment, structures attached with the same signs as the first embodiment represent the same or equivalent parts as the first embodiment, and the explanation about them is omitted. Like the first embodiment, when the data is transferred from the storage area inside the imaging device to the portable storage medium, usually, the image data stored inside the imaging device is the data of an image taken by the imaging device. Therefore, there is no particular problem in setting the data generation (update) date and time as the imaging date and time by acquiring the imaging date and time from the information at the application level and overwriting the information at the file system level.

However, when the data is transferred from the one portable storage medium to the other portable storage medium, it is uncertain whether data of point of transfer is data taken by the imaging device or not. This is because information inside the portable storage medium can be edited by connecting the portable storage medium with a card reader connected to the host device or the like.

Therefore, it is uncertain whether the data generation date and time stored in the system area 300b illustrated in FIG. 3 is the imaging date and time or not. On the other hand, by referring to information at the application level of point of transfer (for example, APPn in FIG. 2), if data generation date and time of transfer destination is overwritten when transferring, it is possible to judge according to a state of the information at the application level. For example, if it is not the imaging data, because the imaging date and time is not stored as the information at the application level, the information cannot be reflected in the portable storage medium of the transfer destination. However, if time stamp information of the transfer destination is overwritten referring to time stamp information of the system area of the point of transfer, such a judgment is impossible In the present embodiment, a method capable of judging storage necessity of the imaging date and time when the data is transferred from the one portable storage medium to the other portable storage medium will be explained. Particularly, a case of retransferring the image data transferred from the image storage section 109b, which is the storage medium inside the imaging device 100, to the portable storage medium 300 or to other portable storage medium will be explained.

Figure 6A:
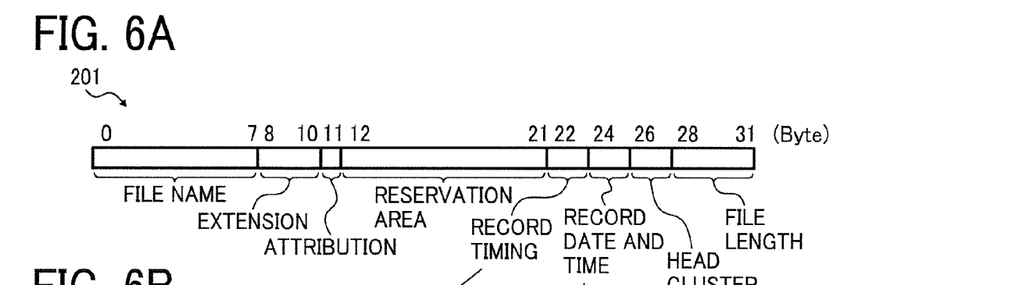
FIGS. 6A to 6C are views illustrating data formations of a system area of the portable storage medium attached to the imaging device according to another embodiment of the invention.

FIG. 6A is a view illustrating data formation of the system area 300b of the portable storage medium 300 according to the present embodiment. FIG. 6A illustrates, for example, management data (management data 201) generated in the system area 300b corresponding to the image data 200 stored in the data area 300c.

Figure 6B:
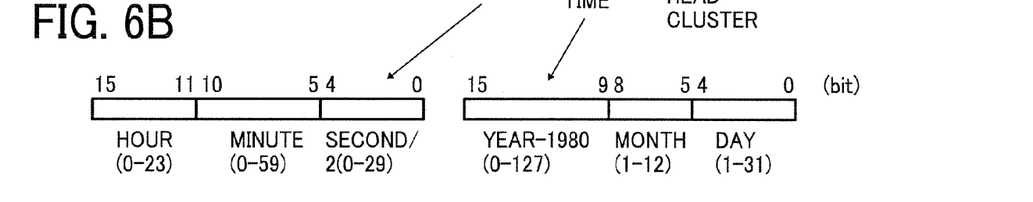

As illustrated in FIG. 6A, the management data 201 has information of record timing, record date and time in addition to file name, extension, attribution, size of file and storage destination, and is constituted of all 32-byte. In addition, each of the record timing and the record date and time is assigned 2-byte, and has a bit configuration as illustrated in FIG. 6B. In the imaging device 100 according to the present embodiment, when the image data 200 is stored or transferred to the portable storage medium 300 like the first embodiment, in addition to the management data 201 illustrated in FIG. 6A, stamp data 202 illustrated in FIG. 6C is generated as additional data, and is stored from the terminal of the system area 300b of the portable storage medium 300 sequentially.

Figure 6C:
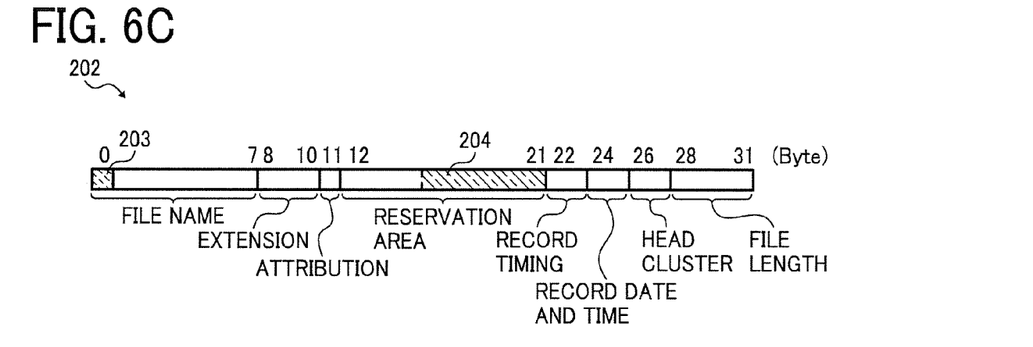

As illustrated in FIG. 6C, the stamp data 202 has substantially the same byte constitution as the management data 201. That is, the stamp data 202 has information of record timing, record date and time in addition to file name, extension, attribution, size of file and storage destination, and is constituted of all 32-byte. Moreover, in the stamp data 202, a stamp identifier 203 is stored in one byte of a data front end, i.e. one byte of the head of seven bytes assigned for the file name in the present embodiment.

In addition, an imaging identifier 204 which indicates that it is an image taken by the imaging device 100 is stored in a reservation area, and other areas are the same byte constitutions as the management data 201 which is a generator of the stamp data. In addition, a first character of the file name is moved to an area of the attribute value and stored. The stamp identifier 203 in one byte according to the present invention is bit data of E5h (hexadecimal number). Data of which the head byte is E5h is recognized as a deletion item (trash box file) in the file system of FAT interchange. Therefore, it is operable without having a detrimental effect on operations in the file system.

Figure 7:
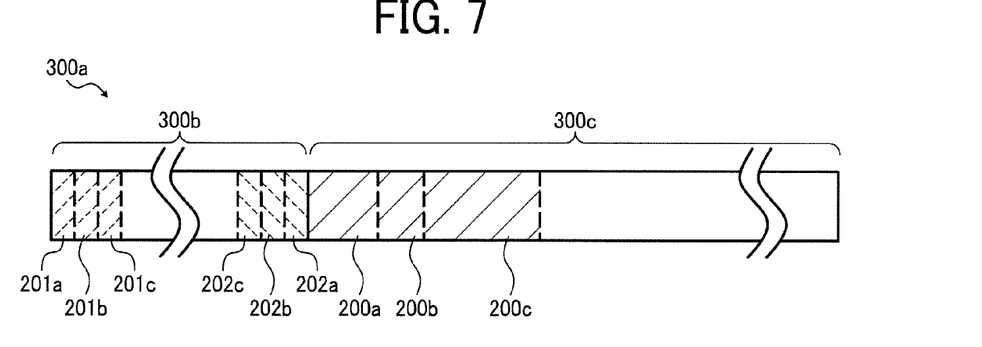
FIG. 7 is a schematic view illustrating the memory area of the portable storage medium attached to the imaging device according to the other embodiment of the present invention.

Next, a mode in which the stamp data 202 is stored in the system area 300b will be explained referring to FIG. 7. FIG. 7 is a schematic view illustrating the entire storage area 300a of the portable storage medium 300. In the storage area 300a, the image data 200 is stored in the data area 300c, and the management data 201 and the stamp data 202 are stored in the system area 300b.

FIG. 7 illustrates an example in which a plurality of image data 200a, 200b and 200c, a plurality of management data 201a, 201b and 201c which are corresponding to the image data 200a, 200b and 200c respectively, and a plurality of stamp data 202a, 202b and 202c which are corresponding to the image data 200a, 200b and 200c respectively, are stored. As illustrated in FIG. 7, the image data 200 is stored from the head of the data area 300c in an order of the image data 200a, 200b and 200c sequentially, and the management data 201 is stored from the head of the system area 300b in an order of the management data 201a, 201b and 201c each of which is corresponding to the image data 200a, 200b and 200c, sequentially.

On the other hand, the stamp data 202 is stored from the terminal of the system area 300b in an order of the stamp data 202a, 202b and 202c sequentially. That is, the stamp data 202 is sequentially stored from the terminal of the system area 300b, which is the area where the management data 201 is stored.

Next, operation of transferring the image data from the one portable storage medium 300 to the other portable storage medium (another portable storage medium 301) in the imaging device 100 according to the present embodiment will be explained referring to FIG. 8.

Figure 8:
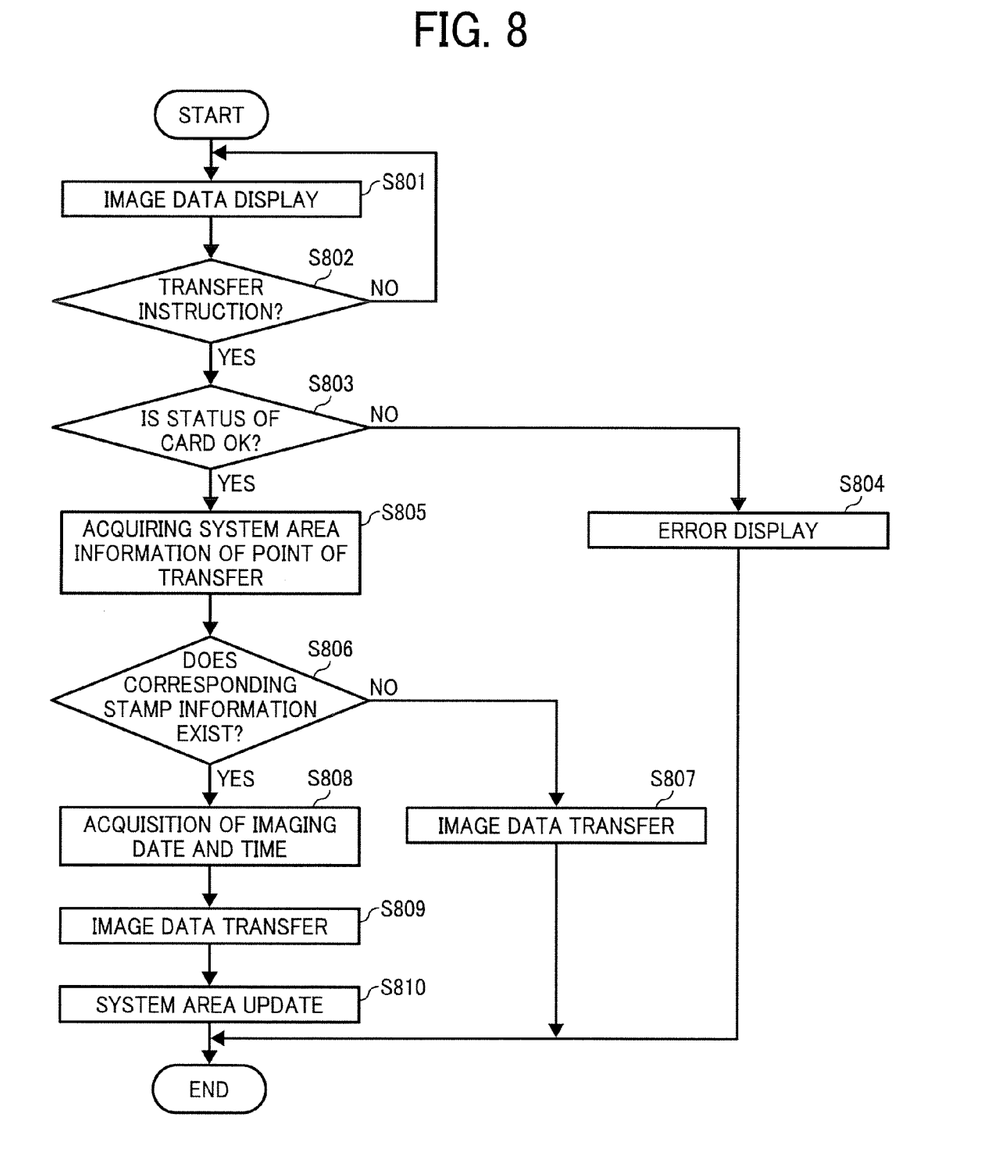
FIG. 8 is a flowchart illustrating data transfer operation in the imaging device according to the other embodiment of the invention.

FIG. 8 is a flowchart illustrating an operation of transferring the image data 200 from the portable storage medium 300 to the portable storage medium 301 in the imaging device 100 according to the present embodiment. When the image data 200 stored in the data area 300c is transferred to the portable storage medium 301, first, the image data 200 transferred to the liquid crystal display 107 is displayed and confirmed (S801). At this time, the image data 200 is displayed on the liquid crystal display 107 as a replicated image as illustrated in FIG. 5A. Here, when a prescribed operation is carried out by a user to the operation section 108, the control section 11a displays a confirmation screen as to whether to transfer the image data to the portable storage medium 301 or not on the liquid crystal display 107 as illustrated in FIG. 5B, and makes a confirmation as to whether to conduct a data transfer for the user (S802).

Here, a case of transferring the image data 200a will be explained.

When the data transfer is instructed by the user (S802), the control section 110a confirms the card slot 105 and the inserted portable storage medium 301 (S803). In addition, a plurality of portable storage media can be inserted in the card slot 105 according to the present embodiment. Here, whether the portable storage medium 301 is inserted in the card slot 105 or not, whether empty capacity of the portable storage medium 301 is sufficient or not, whether a file name is usable or not or the like are confirmed, and thus whether the data transfer is available or not is confirmed.

As a result of the confirmation of S803, if the data transfer is judged to be impossible, the control section 110a displays an error screen on the liquid crystal display 107 (S804) and ends the processing. If the data transfer is judged to be possible as a result of the confirmation of S803, the control section 110a acquires information of the system 300b of the portable storage medium 300 which is point of data transfer, and acquires the management data 201a corresponding to the image data 200a which is specified for transferring, and confirms whether the stamp data 202a corresponding to the management data 201a exists or not (S806). Here, when the stamp data corresponding to the management data 201a does not exist, the image data 200a is recognized as not being the data taken by the imaging device 100, and the image data transfer is executed according to usual processing of the file system (S807), and the processing is ended.

As a result of the confirmation of S803, if the stamp data 202a corresponding to the management data 201a exists, the control section 110a recognizes the image data 200a as the image data taken by the imaging device 100, and acquires information of imaging date and time of the image data 200a (S808). Here, acquisition of the imaging date and time can be obtained from the date and time information included in the management data 201a, and also from APPn included inside the image data 200a.

Then, the image data 200a specified by the user is transferred to the data area of the portable storage medium 301 (S809). Herewith, a system area (a system area 301b) of the portable storage medium 301 is updated. At this time, due to the control section 110a updating the system area 301b according to a regulated FAT format, the date and time recorded in the system area 301b depends on date and time when the transfer of S810 is conducted. Next, the control section 110a rewrites the data generation date and time recorded in the system area 301b into the imaging date and time acquired in S809 (S810), and then ends the processing.

By the above-mentioned operations, it is possible to judge whether the image data 200 stored in the portable storage medium 300 is the data taken by the imaging device 100 or not, and whether to set the data generation date and time recorded in the system area 301b as the data and time when transferring or not.

The same as the first embodiment, when the portable storage medium 301 is inserted in the card slot provided in the host device, and the image data 200 stored in the portable storage medium 301 is confirmed, the data generation date and time is recorded as the imaging date and time. Such an embodiment is especially effective in a case that for example different kinds of portable storage media can be inserted in the card slot 105 of the imaging device 100.

In addition, even in a case that by the generation of the stamp data 202 according to the present embodiment, the image data 200 stored in the portable storage medium 300 is edited by an outside device, and the corresponding management data 201 is updated, the imaging date and time can be confirmed by referring to the stamp data 202. At this time, it only needs to confirm the data generation date and time of the stamp data 202, without needing a special application which is necessary when confirming APPn inside the image data 200.

Furthermore, if the image data 200 stored in the portable storage medium 300 has been edited by the outside device, there is a possibility that the information of the imaging date and time stored in APPn has been lost. Even in such a case, because the stamp data 202 is stored as long as the capacity of the system area 300b of the storage area 300a permits, it is able to know the imaging date and time of the image data 200.

As explained above, in the imaging device 100 according to the present embodiment, when the image data is transferred from the one portable storage medium to the other portable storage medium provided in the device itself, after judging whether the transfer data is the imaging data or not, it is capable of setting the date and time of the time stamp information which is acquirable by the basic software as the imaging date and time only when it is judged that the data is the imaging data.

In addition, in the above explanation, an example is explained in which by setting the stamp identifier 203 stored in the head one byte of the stamp data 202 as E5h, the data is recognized as a deletion item and disregarded in the file system. However, in this case, the stamp data 202 is sequentially overwritten from the area near the head when a used area of the system area 300b exceeds a half, and it is impossible to make the reference in the operations explained in FIG. 8.

In response, for example in the imaging device 100, during storing the image data in the portable storage medium 300, by giving a warning with the control section 110a when the area of use of the system area 300b exceeds a half, it can avoid deletion of the stamp data 202 that the user does not anticipate.

Moreover, as illustrated in FIG. 6, it can promote the reduction in capacity by setting the stamp data 202 as other data which has information that specifies the identifier representing the data being the stamp data and the corresponding management data 201 such as the imaging date and time and the file name, but not as the data which is needed to have the same capacity as the management data 201. In addition, it is possible to set the stamp identifier 203 as an identifier which represents that the data is the stamp data 202 and should not be deleted automatically, except to set the stamp identifier 203 as E5h.

Furthermore, in the above explanation, when the stamp data 202 corresponding to the management data 201 exists, the data generation date and time stored in the system area of the transfer destination is overwritten by the data generation date and time of the point of transfer. In addition to this, it can decide whether to store the data generation date and time or not by further collating the imaging date and time at the application level stored in the image data 200 of the point of transfer with the data generation date and time of the system area.

For example, even for the image data 200 taken by the imaging device 100 and stored in the portable storage medium 300, after addition of simple editing such as rotation of the image and size changing by other devices such as the personal computer, the imaging date and time stored in APPn might be different from the data generation (update) date and time stored in the system area 300b. In such a case, the date and time information stored in the system area 300b is the date and time when the editing is added by the other device even if the stamp data 202 exists, and there is no sense to apply it as the data generation date and time when the data is transferred to the other portable storage medium 301.

Therefore, after the existence of the corresponding stamp data 202 in S806 of FIG. 8 is confirmed, by collating the imaging date and time at the application level stored inside the image data 200 with the data generation date and time stored in the management data 201 corresponding to the image data 200, it can judge whether the storage of the data generation date and time when transferring the data is necessary or not in more detail. In addition, in collation of the imaging date and time at the application level stored in the image data 200 with the data generation date and time stored in the management data 201 corresponding to the image data 200, it is not required to be identical completely.

For example, as illustrated in FIG. 6B, second information on the record timing of the management data 201 stored in the system area 300b is recorded at an interval of two seconds.

On the other hand, when the imaging date and time at the application level inside the image data 200 is recorded at an interval of one second, it is recorded as a different timing according to the imaging timing. Additionally, while the imaging date and time at the application level is recorded as an instantaneous timing of operating the operation section 108, an error may be caused by recording the information of record timing of the management data 201 as the processing timing of the image processing section 104.

Therefore, in the collation of the imaging date and time at the application level with the data generation date and time stored in the management data 201, it is only needed to judge whether the data generation date and time is a timing depending on the imaging date and time stored at the application level, and it is not required to be the identical timing completely. In particular, an error between the date and time of the management data 201 and the imaging date and time of the application data can be within a few seconds, and the error is selected properly with the consideration of a level of possible error between the two parties.

In addition, in the above explanation, as illustrated in FIG. 7, an example is explained in which the stamp data 202 is stored from the terminal of the system area 300b sequentially, it is also possible to store the data separately per directory. That is, in the system area 300b secured separately per directory, the stamp data 202 can be stored from its terminal. By doing so, because in S805 of FIG. 8 it is not needed to refer to all the data of the system area 300b of the point of transfer, and only needs to acquire information of the corresponding directory, the time required for information acquisition can be shortened.

Other Embodiments

In the second embodiment, by confirming the existence of the stamp data 202 generated separately from the management data 201, whether the date and time information included in the management data 201 is the imaging date and time or not is judged. In addition, it can make the judgement by collating the imaging date and time at the application level stored inside the image data 200 with the data generation date and time stored in the management data 201 corresponding to the image data 200. In this case, like the case of generating the stamp data 202, because the memory capacity of the system area 300b is not consumed, it is significant.

According to the present invention, it is possible to provide an electronic imaging device in which date and time of time stamp information acquirable by basic software is capable of being set as imaging date and time, when image data is transferred to a portable storage medium attached to the electronic imaging device itself.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:

1. An imaging device, to which a portable storage medium is attachable, comprising:
a portable storage medium attachment section which attaches the portable storage medium;

an inside storage medium which links image data imaged to information of imaging date and time and stores the data; and a transfer control section which controls a transfer of the image data from the inside storage medium to the portable storage medium, the portable storage medium having a data area which stores the image data transferred and a system area which stores management data generated corresponding to the image data stored in the data area, the transfer control section setting time stamp information of the management data generated in the portable storage medium corresponding to the image data transferred from the inside storage medium to the portable storage medium as the information of imaging date and time linked to the image data transferred, wherein the transfer control section generates additional data which sets the imaging date and time linked to the image data as time stamp information in the system area, when transferring the image data from the inside storage medium to the portable storage medium and the additional data includes an identifier that the additional data is recognized as a deletion item in a file management system on which the portable storage medium depends.

2. An imaging device according to claim 1, wherein the image data stored in the data area is data readable by basic software.

3. An imaging device according to claim 1, wherein in the inside storage medium the information of imaging date and time linked to the image data is stored as time stamp information of a management area of the inside storage medium.

4. An imaging device according to claim 1, wherein in the inside storage medium the information of imaging date and time linked to the image data is stored as additional information of the image data which is readable by a special application software.

5. An imaging device according to claim 1, wherein the additional data is stored from a terminal of an area where the management data generated corresponding to the image data is stored, sequentially.

6. An imaging device according to claim 1, wherein the additional data is data changed from a part of the management data generated corresponding to the image data.

7. An imaging device, to which a portable storage medium is attachable, comprising:

a portable storage medium attachment section which attaches the portable storage medium;

an inside storage medium which links image data imaged to information of imaging date and time and stores the data; and a transfer control section which controls a transfer of the image data from the inside storage medium to the portable storage medium, the portable storage medium having a data area which stores the image data transferred and a system area which stores management data generated corresponding to the image data stored in the data area, the transfer control section setting time stamp information of the management data generated in the portable storage medium corresponding to the image data transferred from the inside storage medium to the portable storage medium as the information of imaging date and time linked to the image data transferred, wherein the portable storage medium attachment section is capable of attaching with another portable storage medium different from the portable storage medium, and the transfer control section generates additional data which sets the imaging date and time linked to the image data as time stamp information in the system area, when transferring the image data from the inside storage medium to the portable storage medium and further has a control unit which is configured to control a retransfer of the image data from the portable storage medium to the another portable storage medium, wherein the another portable storage medium has a data area which stores the image data retransferred and a system area which stores the management data generated corresponding to the image data stored in the data area which is the data readable by the basic software, wherein the transfer control section confirms the additional data is stored in the portable storage medium and sets time stamp information of management data generated in the another portable storage medium corresponding to the image data retransferred from the portable storage medium to the another portable storage medium as information of imaging date and time linked to the image data transferred, when the image data is retransferred from the portable storage medium to the another portable storage medium.

8. An imaging device according to claim 7, wherein the image data stored in the data area is data readable by basic software.

9. An imaging device according to claim 7, wherein in the inside storage medium the information of imaging date and time linked to the image data is stored as time stamp information of a management area of the inside storage medium.

10. An imaging device according to claim 7, wherein in the inside storage medium the information of imaging date and time linked to the image data is stored as additional information of the image data which is readable by a special application software.

11. An imaging device according to claim 7, wherein the additional data is stored from a terminal of an area where the management data generated corresponding to the image data is stored, sequentially.

12. An imaging device according to claim 7, wherein the additional data is data changed from a part of the management data generated corresponding to the image data.

13. An imaging device to which a plurality of portable storage media are attachable, comprising:

a portable storage medium attachment section which attaches a first portable storage medium and a second portable storage medium; and a transfer control section which controls a transfer of the image data from the first portable storage medium to the second portable storage medium, the first and the second portable storage media having a data area which stores the image data transferred and a system area which stores management data generated corresponding to the image data stored in the data area and additional data representing the image data as the imaging data, the transfer control section confirming the additional data is stored in the first portable storage medium and setting time stamp information of the management data generated in the second portable storage medium corresponding to the image data transferred from the first portable storage medium to the second portable storage medium as information of imaging date and time linked to the image data and stored in the first portable storage medium, when the image data is transferred from the first portable storage medium to the second portable storage medium.

14. An imaging device according to claim 13, wherein the image data stored in the data area is data readable by basic software.

* * * * *